(12) United States Patent
Nakazawa

(10) Patent No.: US 7,582,854 B2
(45) Date of Patent: Sep. 1, 2009

(54) FOCUS DETECTION APPARATUS FOR DETECTING A RELATIVE POSITIONAL RELATIONSHIP BETWEEN A PAIR OF OBJECT IMAGES

(75) Inventor: Isao Nakazawa, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 11/829,407

(22) Filed: Jul. 27, 2007

(65) Prior Publication Data

US 2008/0024764 A1    Jan. 31, 2008

(30) Foreign Application Priority Data

Jul. 28, 2006  (JP) .............................. 2006-207167

(51) Int. Cl.
G02B 7/04   (2006.01)
(52) U.S. Cl. ................................. 250/201.2; 250/201.8
(58) Field of Classification Search ............. 250/201.2, 250/201.5, 201.8, 208.1; 396/104, 79, 111, 396/128, 121, 123; 348/345, 350, 349, 353; 356/73

See application file for complete search history.

(56) References Cited

U.S. PATENT DOCUMENTS 5,003,336 A   3/1991  Karasaki et al.
5,771,413 A   6/1998  Suda et al.
6,597,868 B2 * 7/2003  Suda .......................... 396/111

FOREIGN PATENT DOCUMENTS

| EP | 0 834 757 A2 | 4/1998 |
| EP | 0 848 272 A1 | 6/1998 |
| JP | 06-001189 | 1/1994 |
| JP | 09-184969 A | 7/1997 |
| JP | 10-104503 | 4/1998 |
| JP | 11-014896 | 1/1999 |

OTHER PUBLICATIONS

The above foreign document was cited in a Feb. 24, 2009 Korean Office Action that issued in Korean Patent Application No. 10-2007-0076192, a copy of which is enclosed.

* cited by examiner

*Primary Examiner*—Que T Le
(74) *Attorney, Agent, or Firm*—Cowan, Liebowitz & Latman, P.C.

(57) ABSTRACT

A focus detection apparatus comprising a focus detection unit adapted to employ a photoelectric conversion element to detect a relative positional relationship between a pair of object images corresponding to a focus detection field; and wherein the focus detection unit are switchable between a first mode of operation in which such an object image corresponding to a focus detection field is detected by using a first number of areas of the photoelectric conversion element, and a second mode of operation in which such an object image corresponding to a focus detection field is detected by using a second number of areas of the photoelectric conversion element, different from the first number.

14 Claims, 15 Drawing Sheets

11-A

FOCUS DETECTION APPARATUS FOR DETECTING A RELATIVE POSITIONAL RELATIONSHIP BETWEEN A PAIR OF OBJECT IMAGES

BACKGROUND OF THE INVENTION

1. Field of the Invention

The present invention relates to a focus detection technique of detecting the image forming state of an object image by a lens.

2. Description of the Related Art

Conventionally, a focus detection technique based on a so-called phase difference detection scheme is known, which performs focus detection by using light beams passing through the photographing lens of a camera or the like. Various improvements and advances in this technique year by year have achieved functions convenient to users. One such improvement is to increase the number of focus detection fields. That is, the technique associated with a focus detection field, which was initially designed to focus on one middle point in the field, has been improved to increase the number of focus detection fields and also focus on peripheral points. For example, Japanese Patent Publication No. 06-001189 discloses a focus detection apparatus which has achieved a high distance measurement field density by arranging many distance measurement fields in a staggered or matrix pattern. This apparatus can focus a photographing lens at a position more suitable for an object. Japanese Patent Laid-Open No. 11-014896 discloses a focus detection apparatus designed to distribute focus detection fields uniformly at a high density from a similar viewpoint.

In order to increase the number of focus detection fields as compared with the prior art, it is necessary to reduce the size of each sensor array and increase the number of sensor arrays. This leads to disadvantages such as an increase in both circuit size and the size and cost of the photoelectric conversion element.

In addition, reducing the sensor array size leads to disadvantages such as an increase in both the difficulty and cost of the manufacturing process. Furthermore, since the area per pixel is decreased, low-luminance performance deteriorates and the line array length decreases. This leads, for example, to another disadvantage in that the defocus amount that can be measured is reduced.

SUMMARY OF THE INVENTION

It is desirable to provide a focus detection technique capable of increasing the number of focus detection fields without causing any of the above disadvantages.

According to an aspect of the present invention, there is provided a focus detection apparatus comprising: a focus detection unit adapted to employ a photoelectric conversion element to detect a relative positional relationship between a pair of object images corresponding to a focus detection field; and wherein the focus detection unit are switchable between a first mode of operation in which such an object image corresponding to a focus detection field is detected by using a first number of areas of the photoelectric conversion element, and a second mode of operation in which such an object image corresponding to a focus detection field is detected by using a second number of areas of the photoelectric conversion element, different from the first number.

According to another aspect of the present invention, there is provided a focus detection method comprising: employing a photoelectric conversion element to detect a relative positional relationship between a pair of object images corresponding to a focus detection field, switching between a first mode in which such an object image corresponding to a focus detection field is detected by using a first number of areas of the photoelectric conversion element, and a second mode in which such an object image corresponding to a focus detection field is detected by using a second number of areas of the photoelectric conversion element different from the first number.

An embodiment of the present invention can increase the number of focus detection fields without increasing the number of sensor arrays, increasing the size of a photoelectric conversion element, or decreasing focus detection performance or low-luminance performance, thereby obtaining focus detection fields with a higher density.

Further features of the present invention will become apparent from the following description of exemplary embodiments (with reference to the attached drawings).

DESCRIPTION OF THE EMBODIMENTS

The best mode for carrying out the present invention will be described in detail below with reference to the accompanying drawings.

Note that an embodiment to be described below is merely an example implementation of the present invention, and can be modified or changed, as needed, depending on the arrangement of an apparatus to which the present invention is applied and various conditions. The present invention is not limited to the following embodiment.

Figure 1:
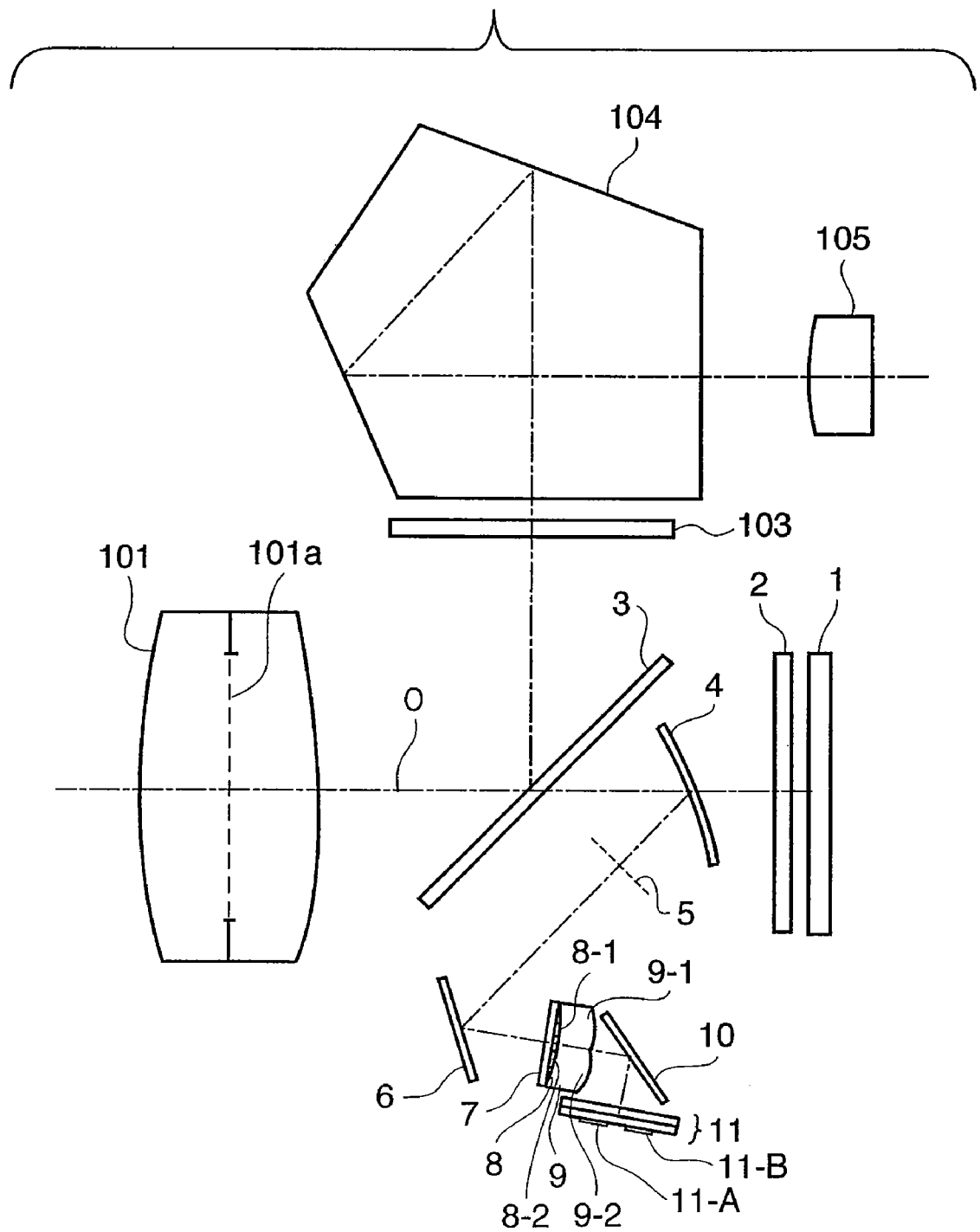
FIG. 1 is a schematic view of the main part of an embodiment to which the present invention is applied.
Figure 2:
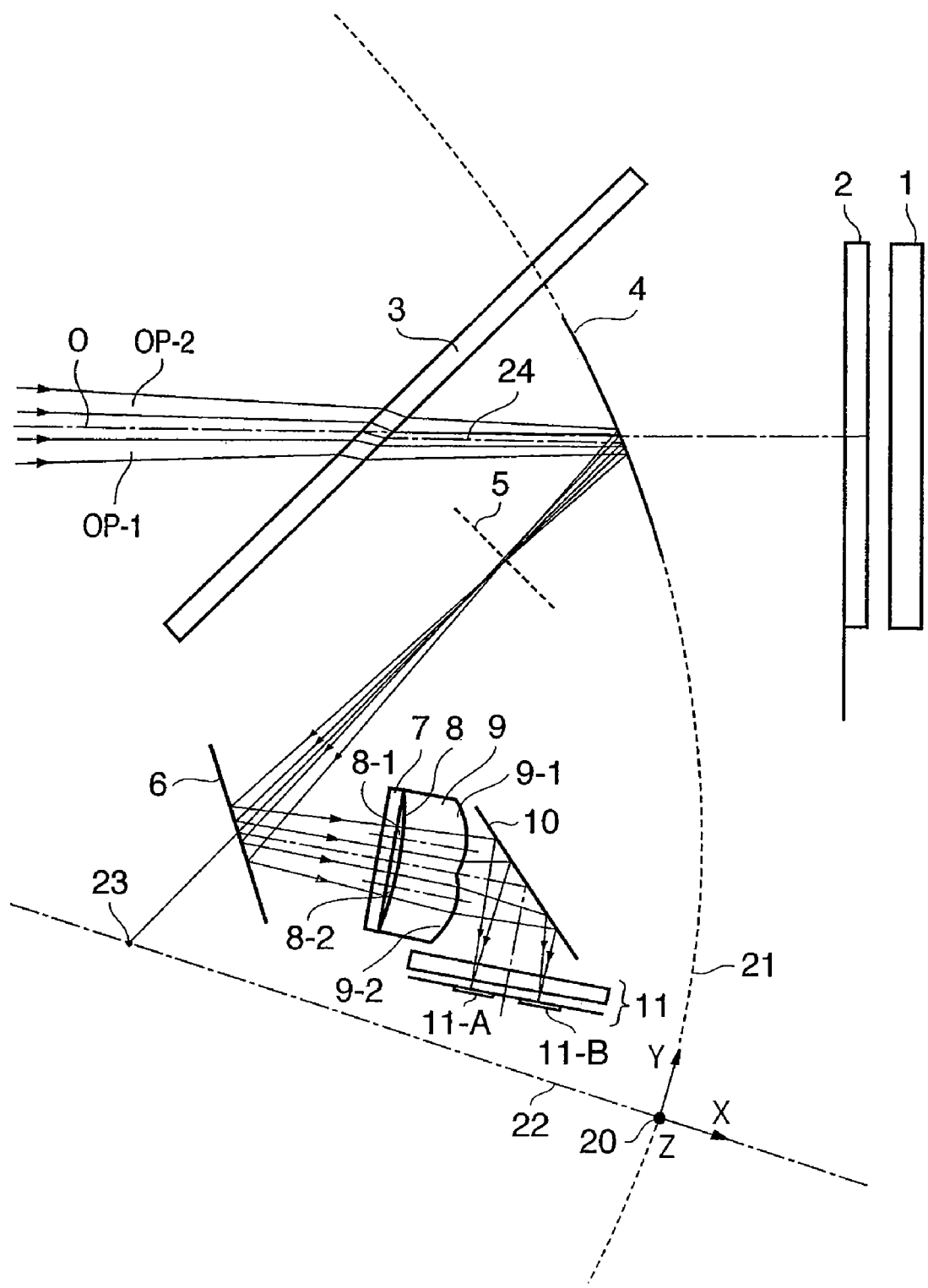
FIG. 2 is a schematic view of the main components constituting a focus detection apparatus in FIG. 1.

FIG. 1 is a schematic view showing the main part of an embodiment in which a focus detection apparatus of the present invention is applied to an optical apparatus such as a camera. FIG. 2 is a schematic view showing the main components of the focus detection apparatus in FIG. 1.

Referring to FIGS. 1 and 2, reference numeral 101 denotes an objective lens having an optical axis O; numeral 1 denotes an image sensor comprising an image sensing element which may be a CMOS sensor or the like; numeral 2 denotes a low-pass filter functioning as an optical low-pass filter which cuts out or attenuates infrared rays; numeral 3 denotes a semitransparent main mirror placed on the optical axis O of the objective lens 101; numeral 103 denotes a focusing glass on which an object image as a light beam entering from the objective lens 101 is formed through the main mirror 3; numeral 104 denotes a penta prism; and numeral 105 denotes an eyepiece through which the user observes the object image on the focusing glass 103.

Reference numeral 4 denotes a first reflecting mirror which is placed on the optical axis O obliquely with respect to the image plane side of the objective lens 101 and comprises a focusing concave mirror, ellipsoidal mirror, or the like; and numeral 5 denotes a paraxial image forming plane which is conjugate to an image forming plane on the image sensor 1, which is formed by the first reflecting mirror 4, and on which an object image is formed.

Reference numeral 6 denotes a second reflecting mirror; 7 denotes an infrared cut filter; 8 denotes a stop having two apertures 8-1 and 8-2; 9 denotes a secondary image forming system which has two lenses 9-1 and 9-2 arranged in correspondence with the two apertures 8-1 and 8-2 of the stop 8; 10 denotes a third reflecting mirror; and 11 denotes a photoelectric conversion element having two area sensors 11-A and 11-B. The first reflecting mirror 4, second reflecting mirror 6, secondary image forming system 9, and the like constitute one element of an optical unit.

The first reflecting mirror 4 in this embodiment has a focusing curvature, and projects the two apertures 8-1 and 8-2 of the stop 8 onto near an exit pupil 101a of the objective lens 101. A metal film made of aluminium, silver, or the like is vapor-deposited on the first reflecting mirror 4 such that only a necessary area reflects light. The first reflecting mirror 4 also serves as a field mask (restriction device) which limits a focus detection range.

Metal films for reflecting light are vapor-deposited on only the minimum necessary areas of the reflecting mirrors 6 and 10 to reduce the amount of stray light striking the photoelectric conversion element 11. Areas of the respective reflecting mirrors which do not function as reflecting surfaces are provided with restriction device. For example, light-absorbing coatings or the like are applied to such areas, or light-shielding members are provided near the areas.

Figure 3:
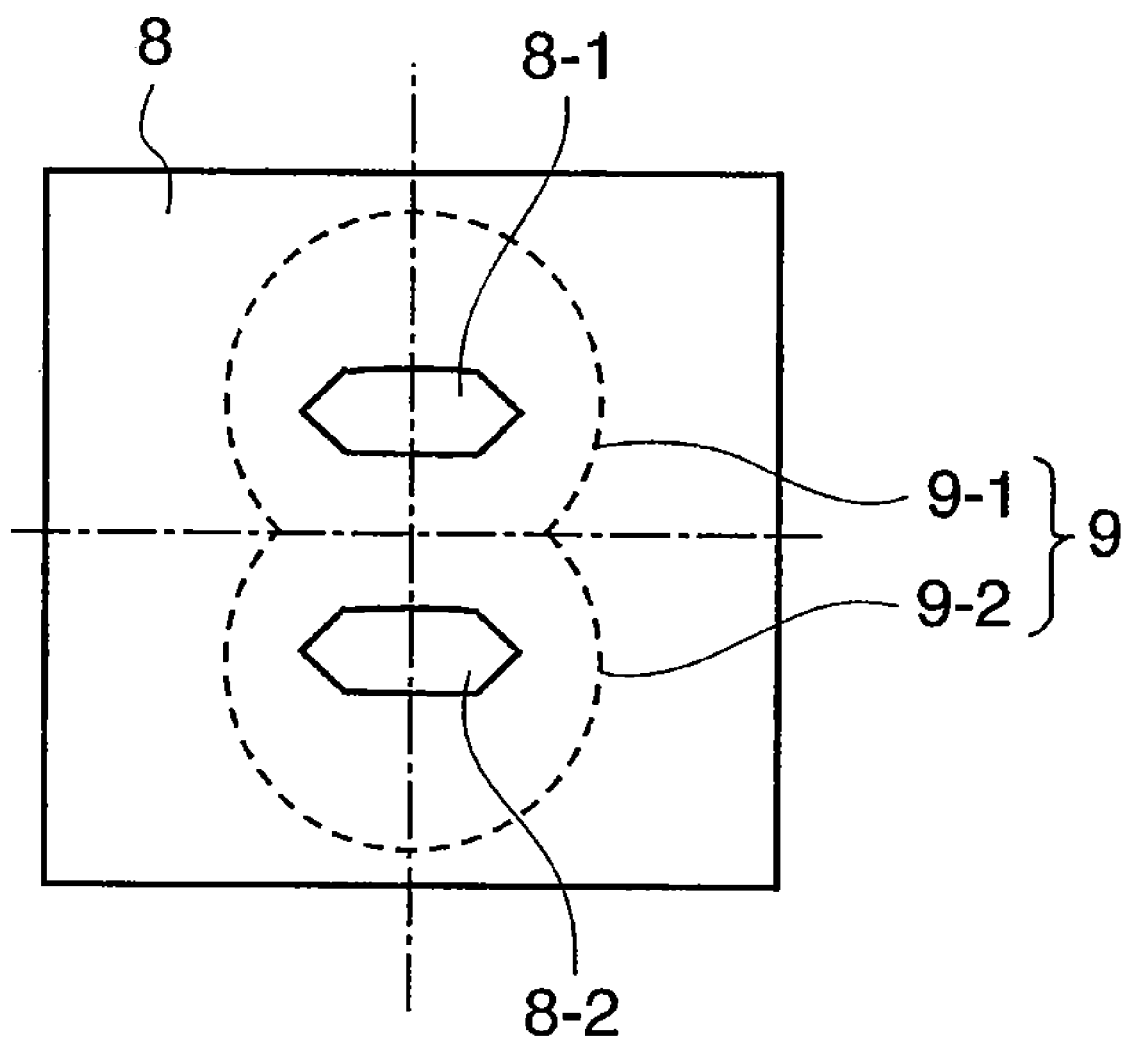
FIG. 3 is a plan view of a stop in FIG. 1.

FIG. 3 is a plan view showing the stop 8 in FIG. 1. The stop 8 is formed by arranging two oblong apertures 8-1 and 8-2 side by side in the direction of the smaller dimension (width dimension) of the apertures (the vertical direction of the image sensing range). The dotted line in FIG. 3 indicates the lenses 9-1 and 9-2 of the secondary image forming system 9 which are arranged behind the apertures 8-1 and 8-2 of the stop 8 in correspondence with them.

Figure 4:
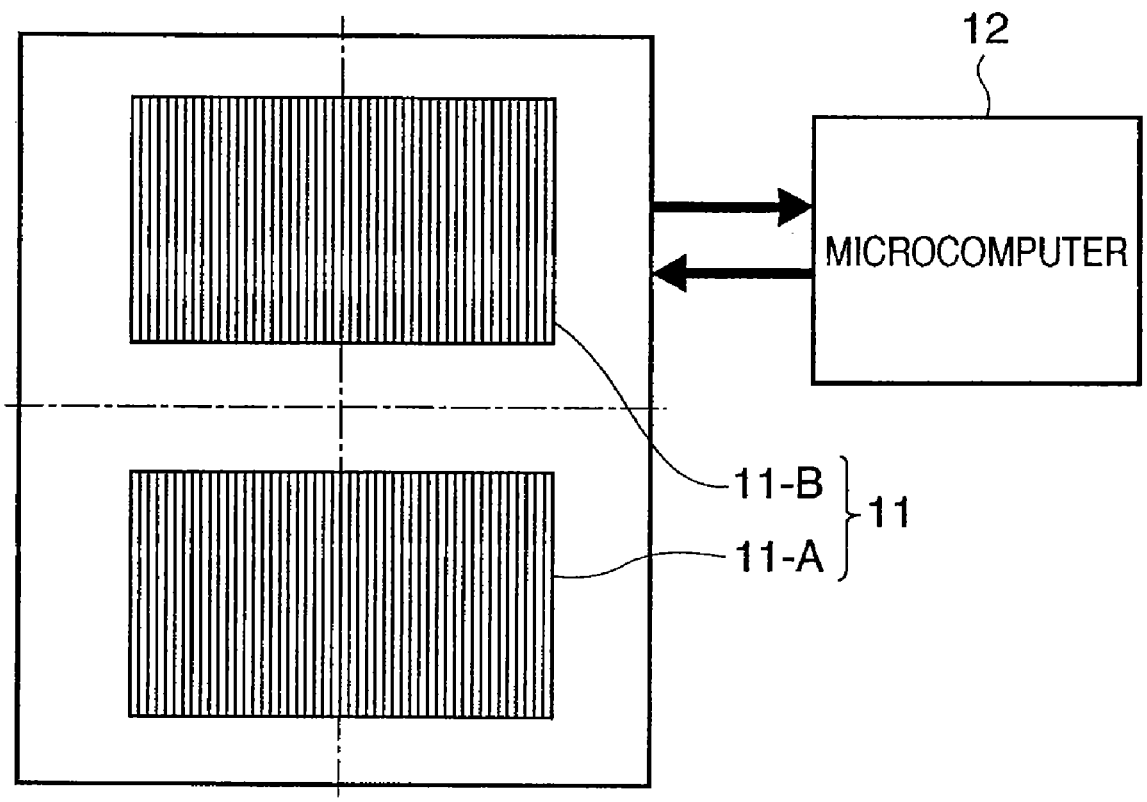
FIG. 4 is a plan view of a photoelectric conversion element.

FIG. 4 is a plan view of the photoelectric conversion element 11. The two area sensors 11-A and 11-B shown in FIG. 1 comprise sensor arrays, each having many pixels arrayed in the vertical direction, which are arranged two-dimensionally, as shown in FIG. 4.

The photoelectric conversion element 11 connects to a microcomputer 12, and performs operation necessary for focus detection, for example, electric charge accumulation control, in accordance with an instruction from the microcomputer 12. The microcomputer 12 also serves as a focus detection processing circuit which performs a focus detection operation by processing an output from the photoelectric conversion element. Note that the microcomputer 12 comprises a CPU, a ROM storing control programs for the CPU and various kinds of data, a RAM which is used as a work area for the CPU (for example for storing various kinds of data), and an I/F unit which controls interfacing with other apparatuses.

In the above arrangement, as shown in FIG. 2, two light beams OP-1 and OP-2 from the objective lens 101 in FIG. 1 are transmitted through the main mirror 3 and are reflected by the first reflecting mirror 4 in a direction almost parallel to a plane of the main mirror 3, thereby forming an object image on the paraxial image forming plane 5. The first reflecting mirror 4 reduces and forms the object image on the paraxial image forming plane 5. Light beams from the object image formed on the paraxial image forming plane 5 are reflected by the second reflecting mirror 6 and change their directions again. The lenses 9-1 and 9-2 of the secondary image forming system 9 then focus the light beams through the infrared cut filter 7 and the two apertures 8-1 and 8-2 of the stop 8. The focused light beams respectively reach the area sensors 11-A and 11-B of the photoelectric conversion element 11 through the third reflecting mirror 10.

The light beams OP-1 and OP-2 in FIG. 2 exemplify the light beams which are focused to form an image in the center of the image sensor 1. However, light beams which are focused to form an image at other positions also reach the photoelectric conversion element 11 through similar routes. On the area sensors 11-A and 11-B of the photoelectric conversion element 11, light amount distributions of corresponding object images are formed. The object images correspond to predetermined two-dimensional areas on the image sensor 1. In this embodiment, using the area sensors 11-A and 11-B makes it possible to perform focus detection at a plurality of points in the two-dimensional area. This also indicates in the following description that there are a plurality of focus detection fields.

In this embodiment, the first reflecting mirror 4 comprises part of a curved surface formed by rotating a quadratic curve about an axis. As this mirror, a rotating ellipsoid is preferably used, in particular.

Referring to FIG. 2, the surface shape of the first reflecting mirror 4 comprises part of a rotating ellipsoid formed by rotating an ellipse 21 having a point 20 as an apex about an axis 22. The focal points of the first reflecting mirror 4 are set near an image position 23 of the center of the stop 8 in the second reflecting mirror 6 and a point (not shown) on an extension of an optical axis 24 after transmission through the main mirror 3.

The point on the extension of the optical axis 24 is set near the exit pupil position of the objective lens 101 (if various objective lenses are interchangeably used, their average exit pupil position is used) to almost cause image formation at the exit pupil position of the objective lens 101 and the incident pupil position of the secondary image forming system 9. This makes the first reflecting mirror 4 function as an ideal field lens. As is obvious from FIG. 2, an area of the rotating ellipsoid which does not include the rotational axis and the vertex is optically used as the first reflecting mirror 4.

A focus state is detected with respect to the light amount distributions of the corresponding pair of object images obtained in the above manner by using the same principle as that of the focus detection method based on the phase difference detection scheme presented as a conventional technique. More specifically, the exit pupil of the objective lens 101 is separated in the vertical direction, and the relative positional relationship between the two area sensors 11-A and 11-B shown in FIG. 4 in the vertical direction is calculated at each pixel position of the area sensors 11-A and 11-B in which a plurality of pixels are arrayed. This makes it possible to two-dimensionally detect the focus state (image forming state) of the objective lens 101 in an arbitrary area and/or a plurality of areas in the image sensing range.

The optimization of a focus detection field arrangement will be described next.

Figure 5:
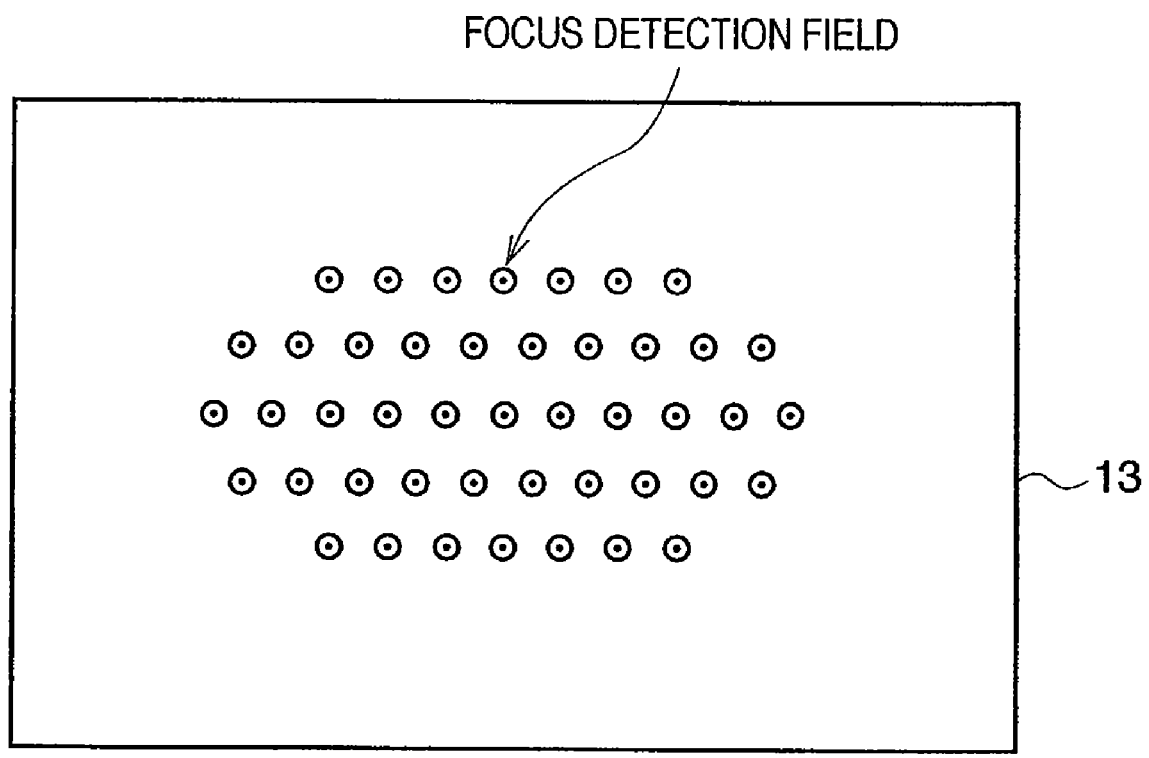
FIG. 5 is a schematic view of a focus detection field arrangement when viewed through the viewfinder of a camera.
Figure 6:
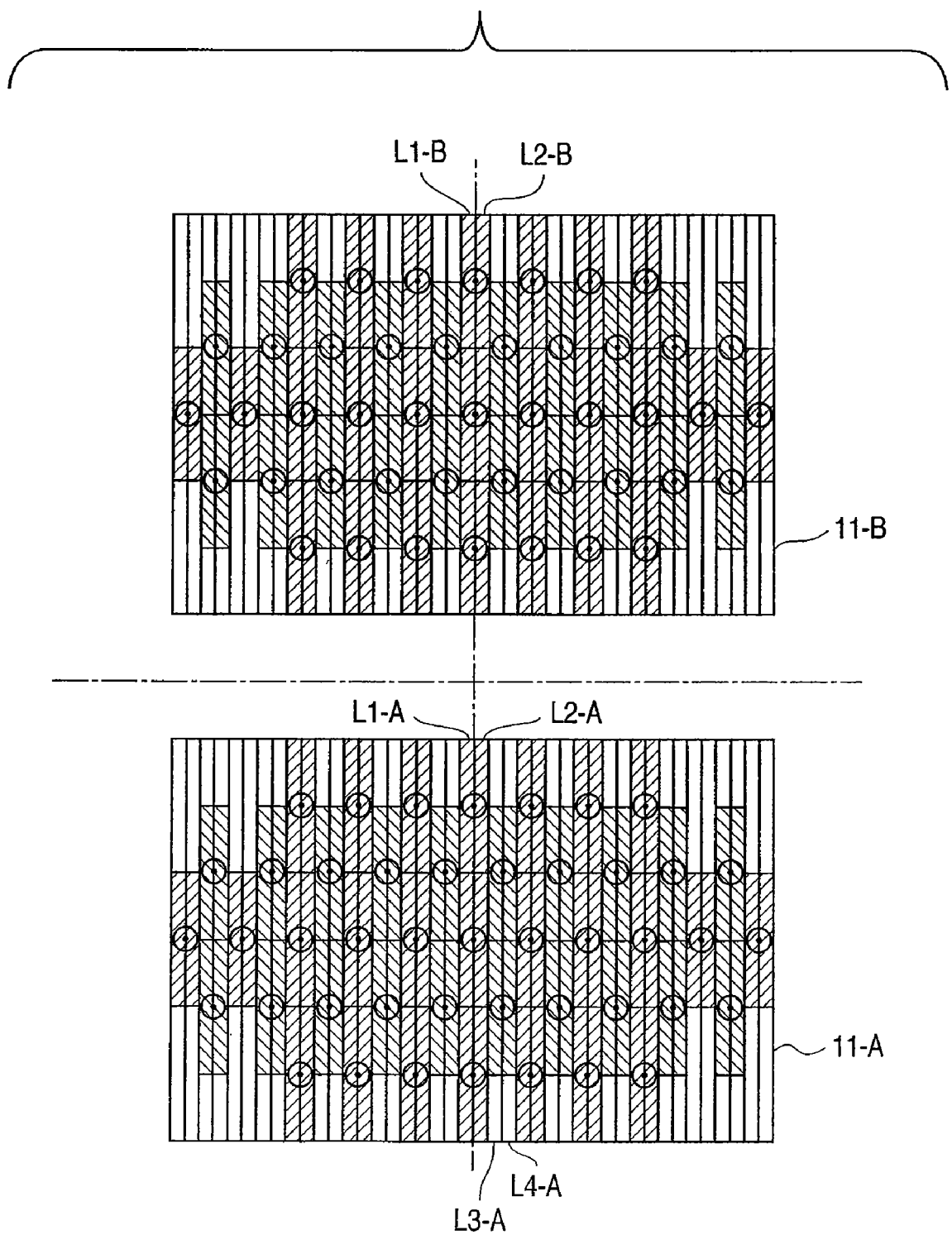
FIG. 6 is a schematic view of focus detection fields projected on the area sensors of the photoelectric conversion element in one previously-considered focus detection apparatus.

FIG. 5 is a schematic view showing a focus detection field arrangement when viewed from the viewfinder of the camera. Reference numeral 13 denotes a field frame, in which each portion indicated by a circle represents a display area corresponding to one focus detection field. FIG. 6 is a schematic view showing a first previously-considered arrangement of the focus detection fields in FIG. 5 when they are projected on the area sensor 11-A (11-B) of the photoelectric conversion element 11.

In this first previously-considered arrangement, two pairs of object images in one focus detection field (one circle) are respectively detected by using two line arrays. In this case, each pair of adjacent line arrays corresponding to the focus detection field is shifted from the next such pair by ½ a pitch of the focus detection fields. This arrangement can improve the accuracy and low luminance performance. Since this technique is described in detail in Japanese Patent Laid-Open No. 10-104503, a description will be omitted. No focus detection fields are arranged near the four corners for the following reason. Since the first reflecting mirror 4 comprises a curved surface of an ellipse or the like, if the apparatus is designed to make light beams reach the four corners, the apparatus size will increase to such an extent that a problem will occur from practical standpoint.

Figure 7:
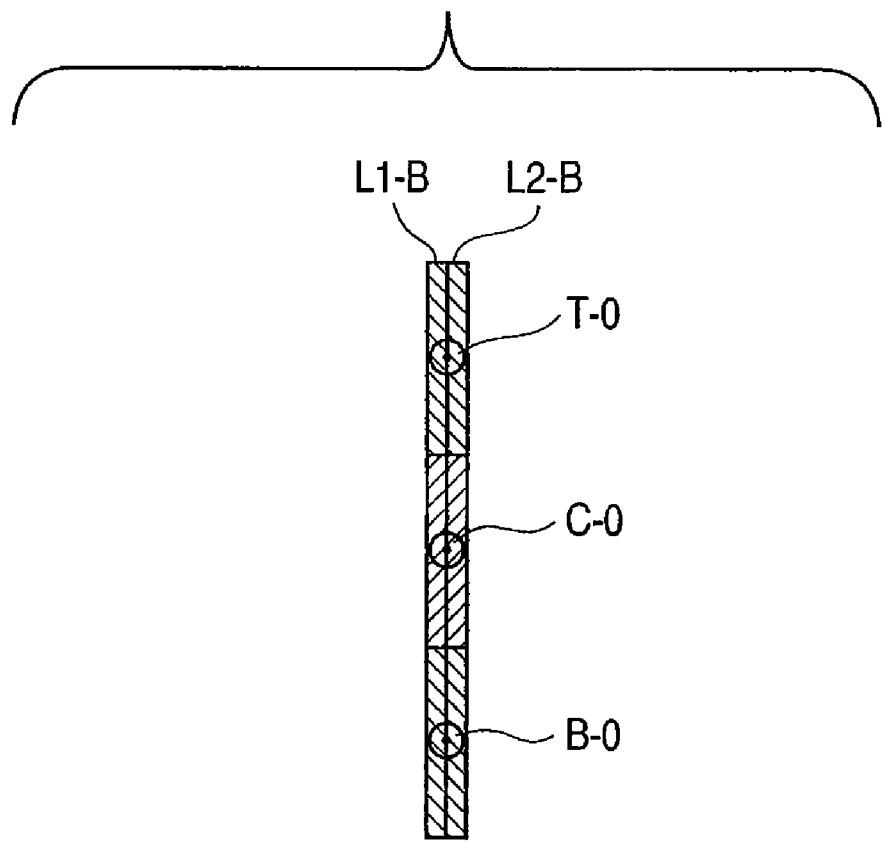
FIG. 7 is an expanded schematic view of line arrays constituting middle focus detection fields in another previously-considered focus detection apparatus.

FIG. 7 is an expanded view of line arrays L1-A and L2-A (L1-B and L2-B) constituting middle focus detection fields in a second previously-considered arrangement of the focus detection fields. Three focus detection fields (C-0, T-0, and B-0) are provided for the two line arrays L1-A and L2-A. Each line array is controlled to be sectionalized into rectangular areas (for example, in the case of the line array L1-A, L1-A-C, L1-A-T, and L1-A-B) corresponding to three focus detection areas. Based on sectionalization by this control, the apparatus performs proper electric charge accumulation (to be referred to as AGC (Auto Gain Control), hereinafter) control for each area, e.g., L1-A-C, L1-A-T, and L1-A-B. The apparatus also performs focus detection calculation for each area based on a corresponding pair of object images.

In this case, sectionalizing one line array into more rectangular areas like those described above can increase the number of focus detection fields. However, when the length of one line array (one rectangular area) in one focus detection field decreases, it becomes difficult to detect a phase shift in a pair of object images in a state wherein the defocus amount is large (large blurring occurs). That is, the focus detection performance will deteriorate.

Decreasing the width of one line array allows focus detection fields to be arranged at a higher density in the horizontal direction. However, since this reduces the light-reception area, it becomes difficult to detect a phase shift in a pair of object images in a low luminance state. This leads to deterioration in focus detection performance.

Figure 8:
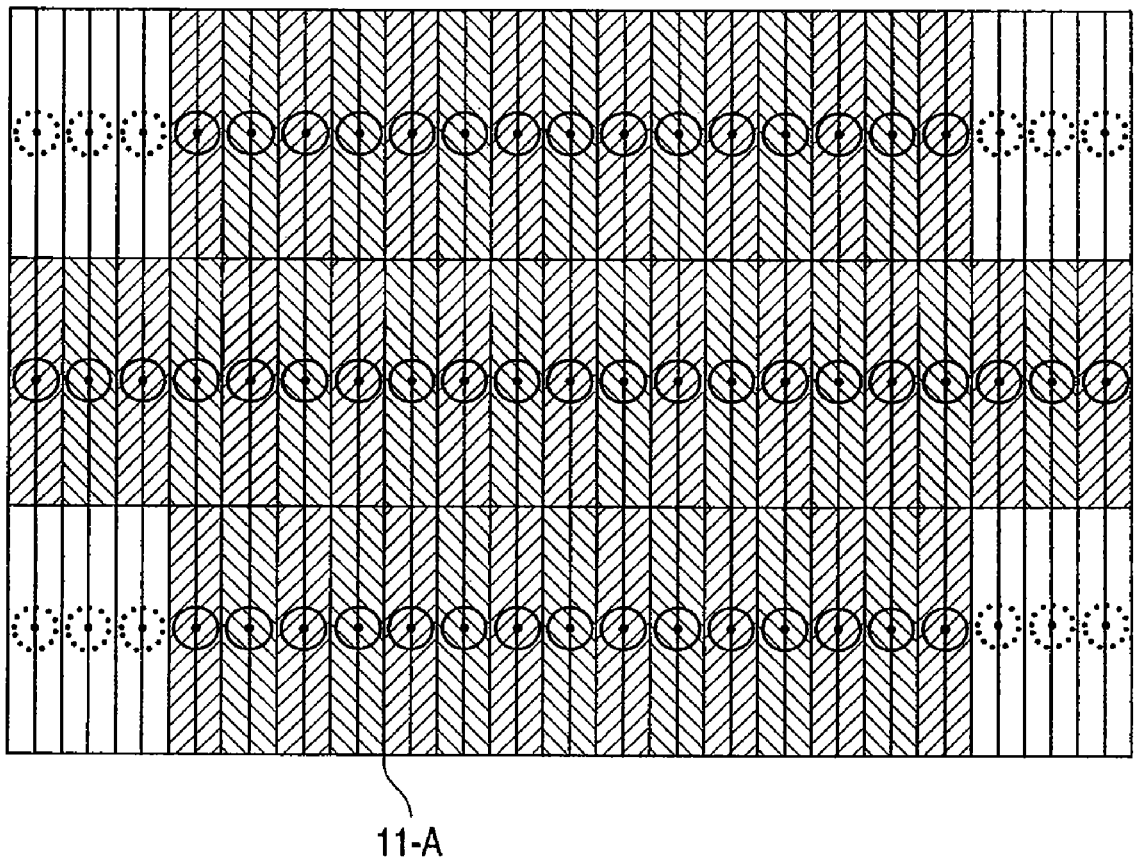
FIG. 8 is a schematic view in which plural line arrays as shown in FIG. 7 are arranged on the entire surface of an area sensor.

The focus detection field sectionalization control shown in FIG. 7 is the result of properly arranging focus detection fields in consideration of the above demerits. FIG. 8 shows the result obtained by applying the sections as shown in FIG. 7 to the entire area sensor.

When the focus detection field is controlled to be sectionalized as shown in FIG. 8, although the number of focus detection fields increases, the line arrays become dense in the arrangement direction of line arrays (the horizontal (first) direction in FIG. 8) and sparse in the line array direction (the vertical (second) direction). That is, this arrangement degrades the balance between the vertical and horizontal focus detection fields. The staggered arrangement shown in FIGS. 6 and 7 is an improvement in the sectionalization balance between the vertical and horizontal focus detection fields (see Japanese Patent Laid-Open No. 11-014896). That is, controlling the focus detection fields by sectionalization while shifting adjacent focus detection fields by ½ the length of a rectangular area in the line array direction makes it possible to obtain a well-balanced arrangement.

Figure 9:
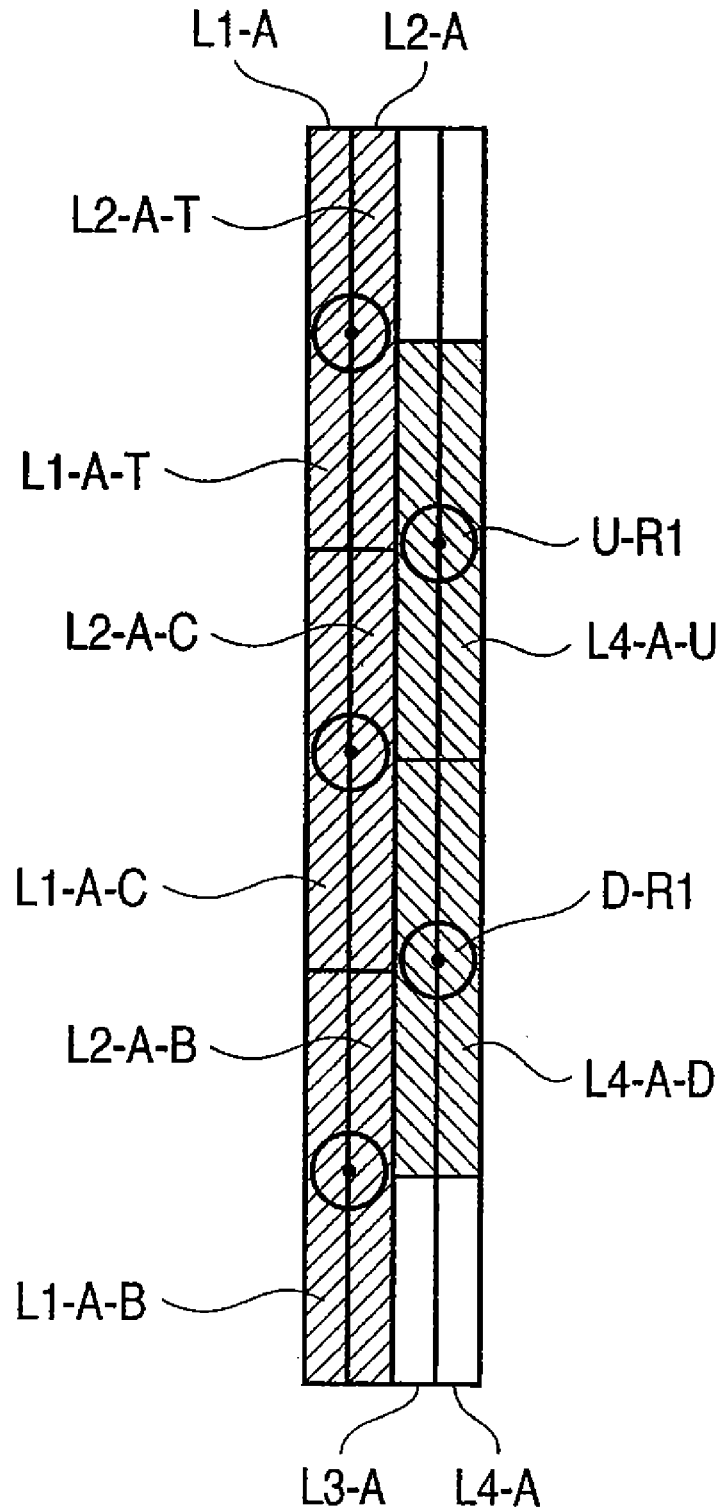
FIG. 9 is an expanded schematic view of line arrays constituting middle focus detection fields in the focus detection apparatus of FIG. 6.

In this case, as shown in FIG. 9, each line array is sectionalized into rectangular areas (for example, L4-A-U and L4-A-D in the case of the line array L4-A) corresponding to two focus detection fields (U-R1 and D-R1) shifted by ½ the length of a rectangular area, and the apparatus performs proper AGC control and focus detection calculation within the ranges of the respective areas.

Figure 10:
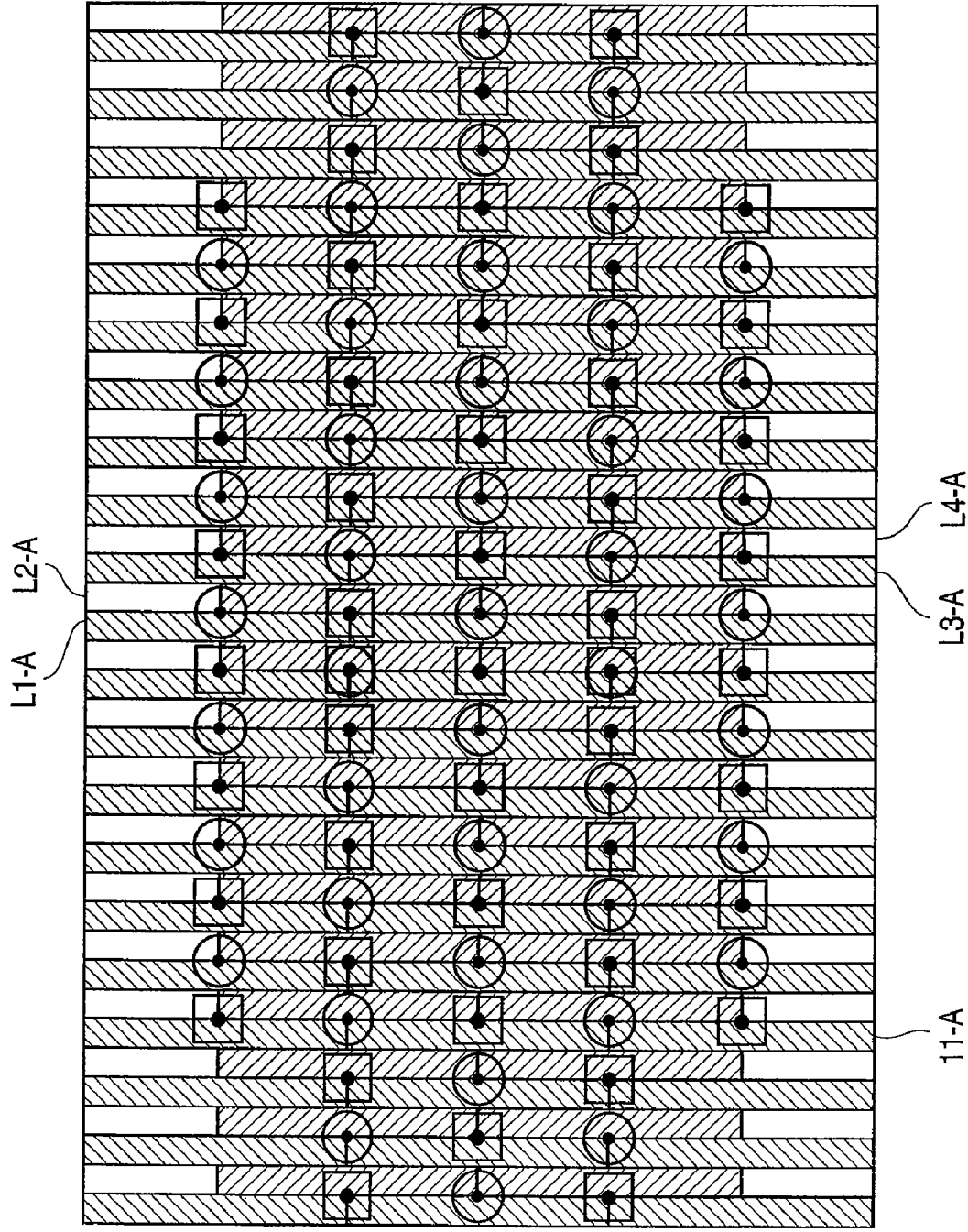
FIG. 10 is a schematic view of focus detection fields in an embodiment of the present invention.

FIG. 10 shows a state wherein focus detection fields are projected on the area sensor 11-A side in an embodiment of the present invention. Each circle indicates one of the focus detection fields shown in FIG. 6, and each square indicates an additional focus detection field newly added to the focus detection fields in FIG. 6. Incidentally, FIG. 10 is only a schematic representation of the focus detection fields in the present embodiment to make the comparison with FIG. 6 easier to comprehend. The true positions of the focus detection fields in the present embodiment are actually at the centers of the rectangular areas in each line, as will be apparent from FIG. 11.

Figure 11:
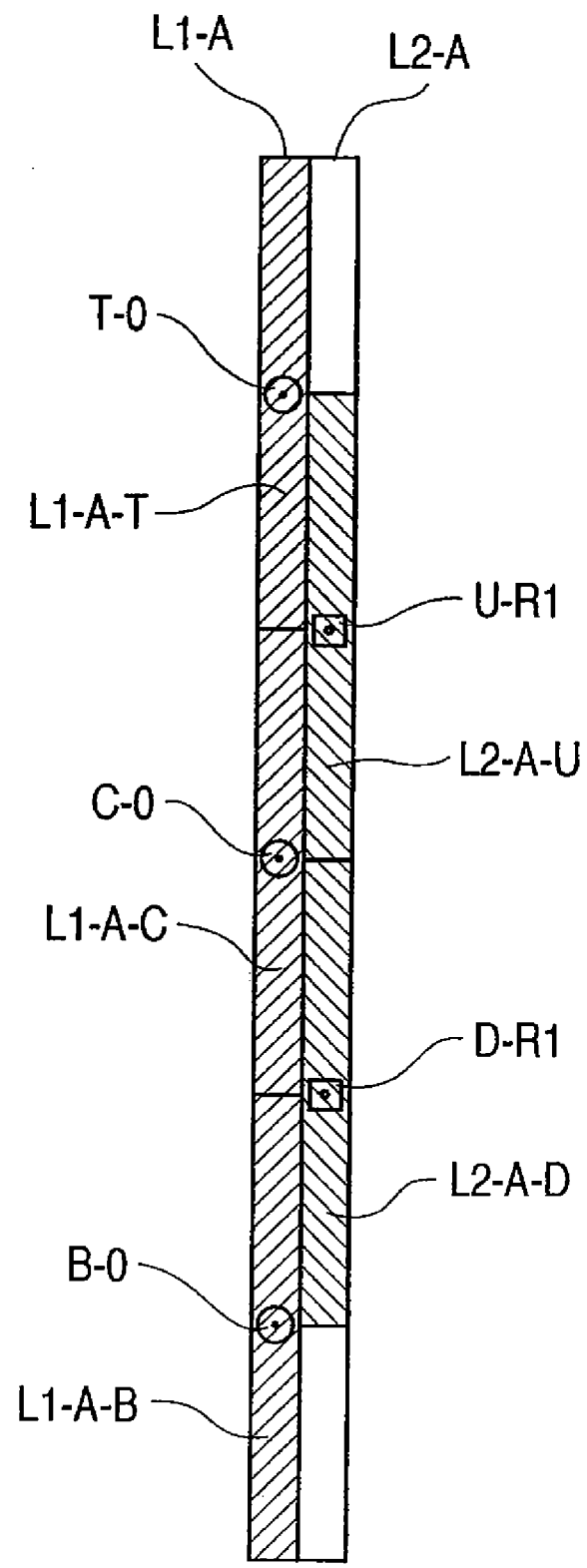
FIG. 11 is an expanded schematic view of line arrays corresponding to the middle focus detection fields in the FIG. 10 embodiment.

FIG. 11 is an extracted view of two line arrays (L1-A and L2-A) corresponding to the middle focus detection fields. One line array L1-A is sectionalized into rectangular areas (L1-A-C, L1-A-T, and L1-A-B) suitable for three focus detection fields (C-0, T-0, and B-0). The line array L2-A adjacent to the line array L1-A is sectionalized into rectangular areas (L2-A-U and L2-A-D) suitable for two focus detection fields (U-R1 and D-R1). This arrangement allows performance of proper AGC control and focus detection calculation within the range of each rectangular area. The focus detection fields C-0, T-0, and B-0 are at the centers of the three rectangular areas L1-A-C, L1-A-T, and L1-A-B. This means that, as compared to the three field detection fields corresponding to the lines L1-A and L2-A in FIG. 9, the three focus detection fields C-C, T-C and B-C in FIG. 11 are shifted by half the line width. This also applies to two rectangular areas L2-A-U and L2-A-D in FIG. 11. In practice, the influence of such a shift of the focus detection fields to this small extent is negligible for a photographer.

As described above, performing detection for one of a pair of object images corresponding to a focus detection field by using one line array has the following effect. When detection for one of a pair of object images corresponding to a focus detection field is performed by using two line arrays, it is possible to arrange five focus detection fields in the two line arrays, as compared to arranging three or two focus detection fields in one line array (see FIG. 9). As shown in FIG. 10, this can greatly increase the number of focus detection fields.

Figure 12:
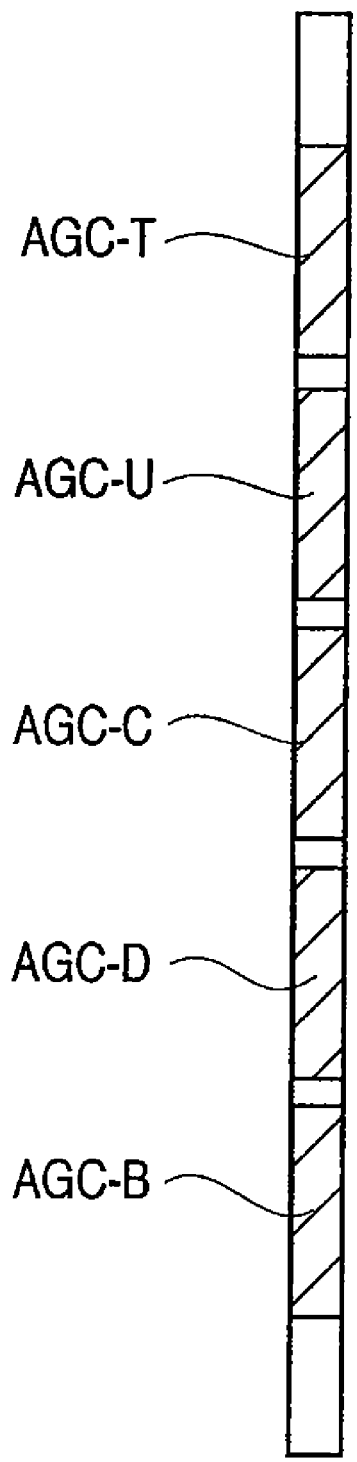
FIG. 12 is a schematic view showing AGC ranges of a line array in the FIG. 10 embodiment.

Electric charge accumulation time control determined for each rectangular area will be described next. As shown in FIG. 12, five AGC ranges (AGC-T, AGC-U, AGC-C, AGC-D, and AGC-B) are set for one line array in advance. An electric charge accumulation time is set for each of these AGC ranges (AGC-T, AGC-U, AGC-C, AGC-D, and AGC-B).

This apparatus is configured to read out the electric charges accumulated in the respective line arrays for both the types of the line arrays L1-A and L2-A. This configuration can be achieved by controlling the areas formed as the rectangular areas. Focus detection calculations are performed based on electric charges read out from the respective types.

Figure 13:
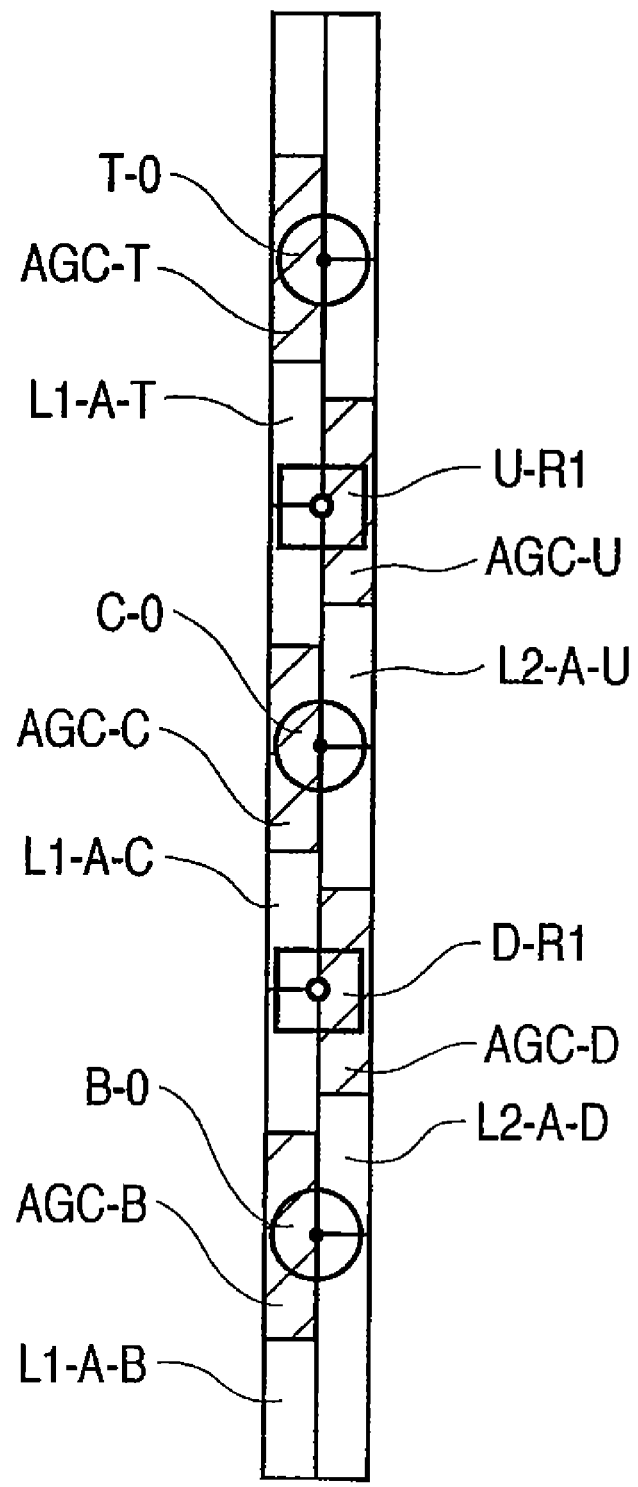
FIG. 13 is an expanded schematic view showing calculation ranges and AGC ranges corresponding to the focus detection fields in FIG. 11.

For example, when performing a focus detection operation with respect to the focus detection fields shown in FIG. 11, the apparatus performs AGC control, i.e., electric charge accumulation time control, for the area LL-A-T in the AGC-T range with respect to the focus detection field T-0, as shown in FIG. 13. The apparatus then performs focus detection calculation based on a signal output from the area L1-A-T as a signal corresponding to one of a pair of object images. Performing the same operation with respect to the four remaining focus detection fields (U-R1, C-0, D-R1, and B-0) makes it possible to perform a focus detection operation for all the focus detection fields.

The above arrangement allows performance of focus detection with respect to all the focus detection fields shown in FIG. 10 by one focus detection operation.

In a first mode, this embodiment performs focus detection operation with respect to each focus detection field by using one line array despite the fact that one focus detection field spans across two line arrays. That is, in a case wherein the focus detection accuracy deteriorates as compared with a case wherein focus detection operation is performed by using two line arrays (for example, a case wherein the luminance of an object is low), it is possible to switch to a second mode in which focus detection is performed based on the sum of data obtained by two line arrays so as to achieve a higher accuracy.

Figure 14A:
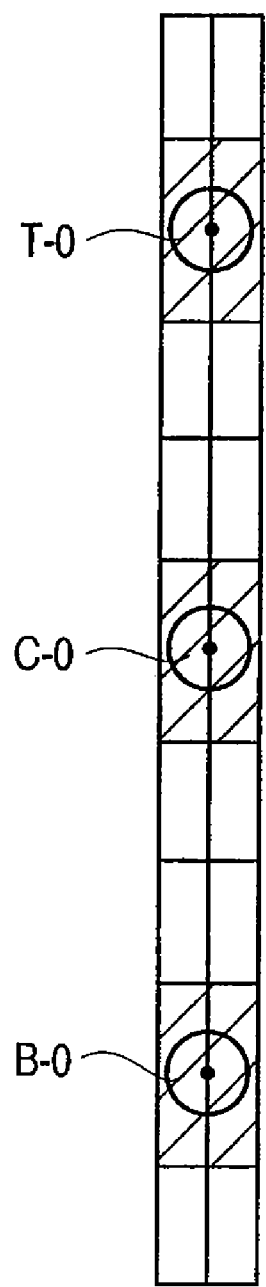
FIGS. 14A and 14B are schematic expanded views for use in explaining an alternative focus detection operation in which focus detection for a given focus detection field is performed using two line arrays.
Figure 14B:
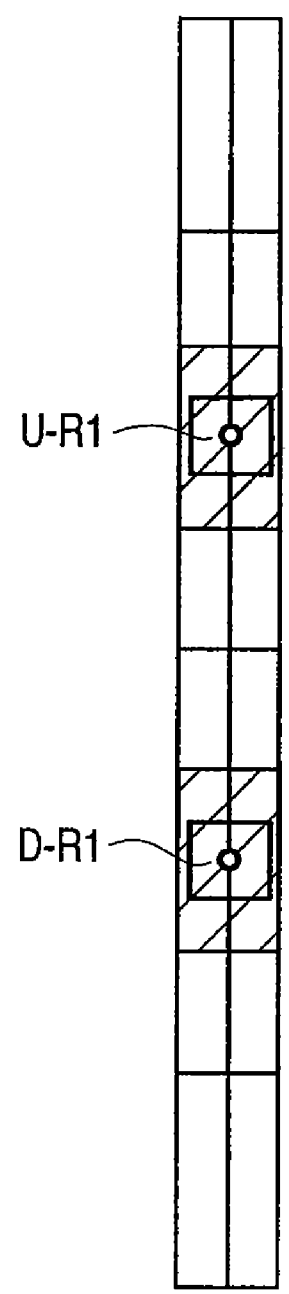

This embodiment allows to properly switch AGC control ranges and focus detection calculation ranges. For example, control based on the sections shown in FIG. 10 is switched to that shown in FIG. 8. Also, the ranges can be switched as shown in FIGS. 14A and 14B. The shaded areas in FIGS. 14A and 14B represent AGC control ranges. More specifically, the embodiment allows performance of focus detection operation using two line arrays with respect to the three focus detection fields C-0, T-0, and B-0 in FIG. 14A and the two focus detection fields U-R1 and D-R1 in FIG. 14B.

In this manner, using a plurality of modes can prevent deterioration in performance that might otherwise occur when attempting to carry out the focus detection operation using one line array. For example, in the first mode, one of a pair of object images corresponding to a focus detection field is detected by using a first number of areas (in this example, two areas). In the second mode, one of a pair of object images corresponding to a focus detection field is detected by using a second number of area (in this example, one area) different from the first number of areas. The number of focus detection fields in the second mode is larger than that in the first mode, but the first mode can achieve a higher accuracy than the second mode.

Figure 15:
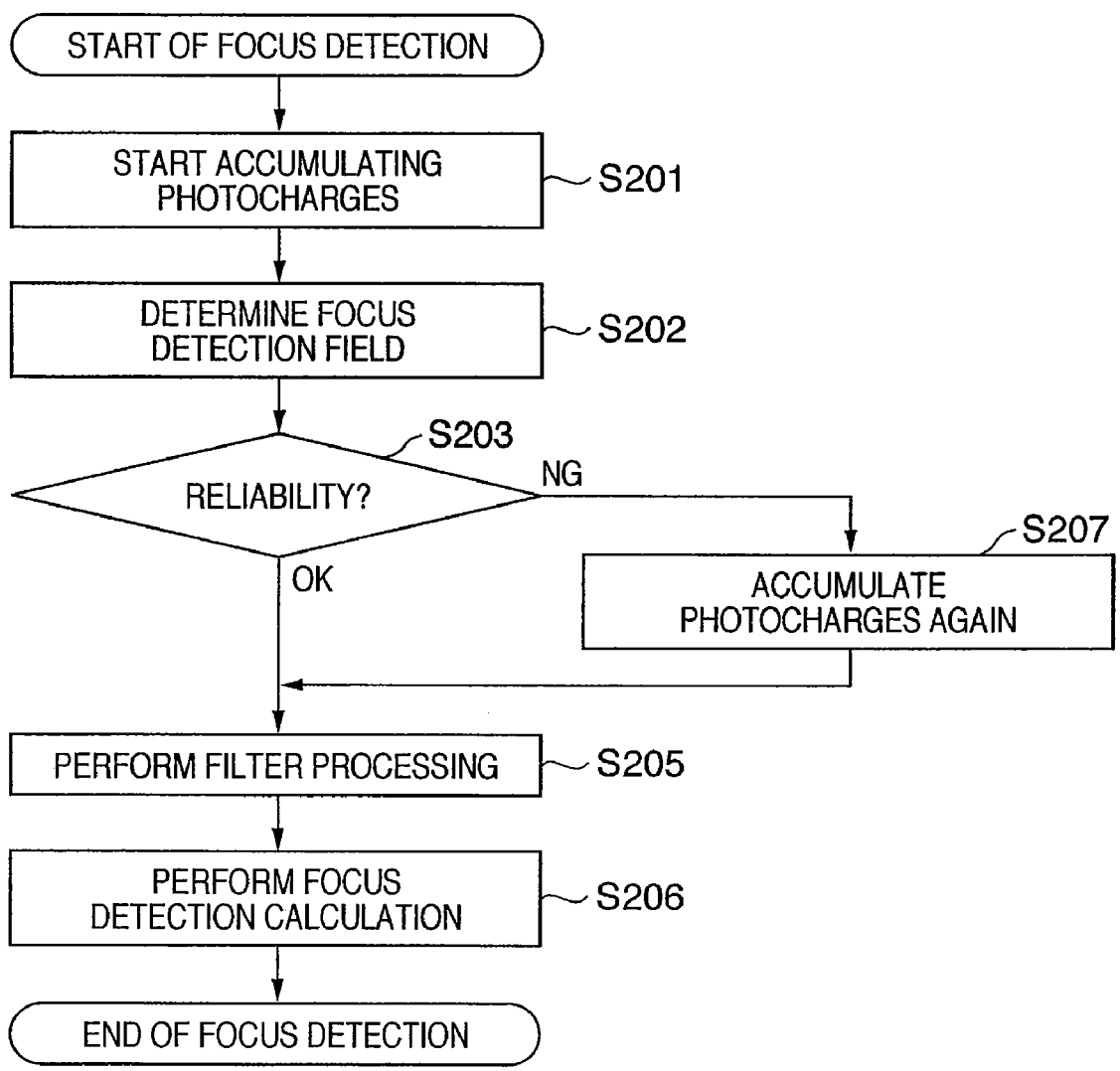
FIG. 15 is a flowchart for use in explaining focus detection operations in an embodiment of the present invention.

FIG. 15 is a flowchart for use in explaining a focus detection operation in this embodiment. Each step described above may be implemented by causing the microcomputer 12 to execute the programs stored in the ROM for the recording operation of the camera.

Referring to FIG. 15, when starting the focus detection operation, the microcomputer 12 accumulates photocharges in accordance with AGC control in each focus detection field shown in FIG. 11 in step S201, thereby obtaining an image signal with an almost constant magnitude regardless of the luminance of the object.

In step S202, the microcomputer 12 determines a focus detection field which is most likely to be a main object from each image signal.

In step S203, the microcomputer 12 determines the reliability of an image signal in the determined focus detection field. If the microcomputer 12 determines that the reliability is OK, the process advances to step S205 to perform filter processing, for example, removing low-frequency components from the image signal.

In step S206, the microcomputer 12 performs a focus detection calculation to detect a focus state from the correlation of the distance between two images in consideration of various kinds of information such as the state of the objective lens 101.

If the microcomputer 12 determines that the reliability of the image signal detected in step S203 is not good (NG), the process advances to step S207 to accumulate photocharges again to output another image signal. In accumulating photocharges again, for example, the above-described second mode is switched to the first mode. In this case, the microcomputer 12 performs accumulation and read operation using one of two line arrays as shown in FIGS. 14A and 14B with respect to the focus detection field determined in step S202. For example, when the focus detection field determined in step S202 is T-0, the line array in FIG. 14A is used. When it is D-R1, the line array in FIG. 14B is used. If the luminance of the object is low, adding image signals from two line arrays makes it possible to increase the signal level and handle the signal as a signal with a high SN ratio. The flow then advances to step S204 to perform focus detection operation as in the above manner so as to perform the focus detection calculation.

According to the above operation, if the accuracy of the focus detection operation using one line array is low in reliability, a focus detection operation using two line arrays is performed. This apparatus can therefore achieve the same detection accuracy as that of a focus detection operation using two line arrays as a whole.

In addition, if the reliability of an image signal in a focus detection field is NG, the apparatus accumulates electric charges again. Accordingly, this increases the required processing time. However, since this operation is performed only for focus detection areas which have already been determined, the apparatus can carry out the above operation with only a slight increase in time.

This embodiment can increase the number of focus detection fields without causing any increases in the number of sensor arrays and the size of a photoelectric conversion element and any deteriorations in focus detection performance and low luminance performance, thereby implementing a focus detection field arrangement with a higher density.

In the above description, upon detecting one of a pair of object images, two lines are used in the first mode and one line is used in the second mode. However, the same effect can be obtained when three lines are used in the first mode and two lines or one line undergo sectionalization control in the second mode.

An embodiment of the present invention can provide a focus detection apparatus which comprises a photographing lens, a photoelectric conversion element including light-receiving area, and an image forming optical system which forms a plurality of focus detection fields for detecting a focus state of the photographing lens by projecting a light beam passing through the photographing lens onto the photoelectric conversion element, the apparatus further comprising means for forming a plurality of sensor areas within at least one said light-receiving area, the plurality of sensor areas being arrayed in first and second orthogonal directions, and means for switching between first and second different arrangements of such focus detection fields, the first arrangement having a greater number of focus detection fields than the second arrangement.

Another embodiment of the present invention can provide a focus detection apparatus which comprises a photographing lens, a photoelectric conversion element including light-receiving area, and an image forming optical system which forms a plurality of focus detection fields for detecting a focus state of the photographing lens by projecting a light beam passing through the photographing lens onto the photoelectric conversion element, the apparatus further comprising means for forming a plurality of sensor areas within at least one said light-receiving area, the plurality of sensor areas being arrayed in first and second orthogonal directions, and means for switching between carrying out a first focus detection operation, in which focus detection for a focus detection field is performed using a first number of the sensor areas, and a second focus detection operation in which focus detection for a focus detection field is preformed using a second number of the sensor areas, different from the first number.

It will be understood that, in the FIG. 10 embodiment, the areas into which the sensor 11-A was sectionalized are the same in both modes, and two areas are used for a focus detection field in the first mode and one area is used for a focus detection field in the second mode. However, it would also be possible to use one area in each mode, with the area used in one mode being a different size from the area used in the other mode.

Thus, it is possible to provide a focus detection apparatus which comprises a photographing lens, a photoelectric conversion element including light-receiving area, and an image forming optical system which forms a plurality of focus detection fields for detecting a focus state of the photographing lens by projecting a light beam passing through the photographing lens onto the photoelectric conversion element, the apparatus further comprising means for forming a plurality of sensor areas within at least one said light-receiving area, the plurality of sensor areas being arrayed in first and second orthogonal directions, and means for switching between a first mode of operation, in which focus detection for a focus detection field is performed using a sensor area having a first size, and a second mode of operation in which focus detection for a focus detection field is preformed using a sensor area of a second size, different from the first size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-207167, filed Jul. 28, 2006, which is hereby incorporated by reference herein in its entirety.

What is claimed is:

1. A focus detection apparatus comprising:
a sensor which comprises photoelectric conversion elements of rectangular areas; and
a focus detection unit which detects a relative positional relationship between a pair of object images from the sensor corresponding to a focus detection field;
wherein the sensor is switchable between a first mode of operation in which such an object image corresponding to a focus detection field is detected by using a first number of said rectangular areas of the photoelectric conversion element, and a second mode of operation in which such an object image corresponding to said focus detection field is detected by using a second number of said rectangular areas of said photoelectric conversion element, different from said first number.

2. The apparatus according to claim 1, further comprising a sectionalizing unit which sectionalizes the photoelectric conversion element into a plurality of said rectangular areas for use by the focus detection unit to detect such object images.

3. The apparatus according to claim 2, wherein said sectionalizing unit forms a first arrangement of said rectangular areas in said first mode and forms a second arrangement of said rectangular areas, different from said first arrangement, in said second mode.

4. The apparatus according to claim 1, wherein said rectangular areas are mutually-similar rectangular areas.

5. The apparatus according to claim 1, wherein said first number is higher than said second number.

6. The apparatus according to claim 5, further comprising a control unit which causes the focus detection unit to operate initially in said second mode and to switch to said first mode in the event that the detection results in said second mode are unsatisfactory.

7. The apparatus according to claim 5, wherein said first number is two and said second number is one.

8. The apparatus according to claim 1, wherein said focus detection unit employs said photoelectric conversion element to detect a relative positional relationship between a pair of object images corresponding to each of a plurality of such focus detection fields.

9. The apparatus according to claim 8, wherein an arrangement of the focus detection fields in said first mode is different from an arrangement of the focus detection fields in said second mode.

10. The apparatus according to claim 8, wherein a total number of the focus detection fields in said first mode is different from a total number of the focus detection fields in said second mode.

11. The apparatus according to claim 1, wherein said sectionalizing unit are operable to form one or more said rectangular areas along each said line.

12. The apparatus according to claim 11, wherein, when the focus detection unit are operating in one of said first and second modes, the sectionalizing unit causes said one or more rectangular areas formed in one said line to be staggered relative to said one or more rectangular areas formed in the next line.

13. The apparatus according to claim 8, wherein the focus detection unit controls electric charge accumulation with respect to said rectangular areas of the photoelectric conversion element corresponding to the pair of object images for each of the focus detection fields.

14. A focus detection method comprising:

employing a photoelectric conversion element of rectangular areas to detect a relative positional relationship between a pair of object images corresponding to a focus detection field, switching between a first mode in which such an object image corresponding to a focus detection field is detected by using a first number of said rectangular areas of the photoelectric conversion element, and a second mode in which such an object image corresponding to a focus detection field is detected by using a second number of said rectangular areas of the photoelectric conversion element different from said first number.

* * * * *